United States Patent
Lim

(10) Patent No.: US 6,885,113 B2
(45) Date of Patent: Apr. 26, 2005

(54) ENGINE CONTROL SYSTEM AND METHOD FOR HYBRID ELECTRIC VEHICLE

(75) Inventor: Han-Seung Lim, Paju (KR)

(73) Assignee: Hyundai Motor Company, Seoul (KR)

(*) Notice: Subject to any disclaimer, the term of this patent is extended or adjusted under 35 U.S.C. 154(b) by 100 days.

(21) Appl. No.: 10/326,013

(22) Filed: Dec. 18, 2002

(65) Prior Publication Data

US 2004/0046394 A1 Mar. 11, 2004

(30) Foreign Application Priority Data

Sep. 5, 2002 (KR) .................................. 2002-0053528

(51) Int. Cl.[7] .............................................. F02D 35/00
(52) U.S. Cl. ..................... 290/40 R; 290/41; 290/40 A; 318/139
(58) Field of Search ................................ 290/40 R, 41, 290/40 A, 40 C; 318/139; 322/10, 13

(56) References Cited

U.S. PATENT DOCUMENTS 6,307,277 B1 * 10/2001 Tamai et al. ............... 290/40 C
6,316,842 B1 * 11/2001 Kuroda et al. ............. 290/40 C
6,441,506 B2 * 8/2002 Nakashima ................ 290/40 C
6,611,115 B2 * 8/2003 Wakashiro et al. ......... 318/139
6,621,175 B1 * 9/2003 Kuroda et al. ............. 290/40 D

FOREIGN PATENT DOCUMENTS

| JP | 10-077937 | 3/1998 |
| JP | 2000-320365 | 11/2000 |
| JP | 2001-132490 | 5/2001 |

* cited by examiner

Primary Examiner—Nicholas Ponomarenko
(74) Attorney, Agent, or Firm—Morgan Lewis & Bockius LLP

(57) ABSTRACT

The present invention relates to an engine control system and method for a hybrid electric vehicle. The system includes an engine, a motor mounted to one side of the engine, and a controller receiving one or more signals indicating vehicle operational conditions, and performing control of operations of the engine and motor. The controller is programmed to perform control logic (i.e., the method) that includes determining if predetermined idle stop conditions are satisfied based on the one or more signals; performing control into an idle stop state if the predetermined idle stop conditions are satisfied; and discontinuing idle stop if, following detection of a reverse range On signal, it is determined that the reverse range On signal is maintained for a predetermined time interval.

10 Claims, 2 Drawing Sheets

ENGINE CONTROL SYSTEM AND METHOD FOR HYBRID ELECTRIC VEHICLE

FIELD OF THE INVENTION

The present invention relates to an engine control system and method, and more particularly, to an engine control system and method for a hybrid electric vehicle.

BACKGROUND OF THE INVENTION

Most vehicles in use today utilize internal combustion engines. The internal combustion engine generally operates optimally at high engine speeds. One result for this is that the internal combustion engine generates a significant amount of exhaust gases when operating at low engine speeds. To remedy this problem, vehicles that operate optimally in all conditions are being developed. The hybrid electric vehicle is an example of such a vehicle.

There are many different types of hybrid electric vehicles, but they generally combine the internal combustion engine of a conventional vehicle with the batteries and electric motor of an electric vehicle. The power of the engine and that of the electric motor are suitably used in the hybrid electric vehicle so that the engine operates in an engine speed region that realizes good fuel consumption rates and low emissions. That is, the hybrid electric vehicle realizes reductions in fuel consumption and exhaust gases compared to conventional vehicles.

In the hybrid electric vehicle, the engine is designed to discontinue operation under certain conditions (hereinafter referred to as "idle stop"). Fuel consumption is further reduced by such operation. Vehicle speed, engine temperature, the depressed state of the brake pedal, and the depressed state of the accelerator pedal are determined, and in the case where predetermined drive conditions (i.e., idle stop conditions) are satisfied, control is performed to effect idle stop.

In an engine control method for typical hybrid electric vehicles, idle stop is discontinued if shifting into the reverse R range is performed. However, since shifting into the reverse R range occurs briefly when changing the shift range from the drive D range to the park P range (or from the park P range to the drive D range), if idle stop is engaged during this process, it will then be disengaged. That is, since the reverse R range is between the park P and drive D ranges, idle stop is disengaged while performing shifting between these two ranges then again engaged. However, it is preferable that the idle stop state be maintained for various reasons including the fact that fuel is consumed with the abrupt disengagement of idle stop.

SUMMARY OF THE INVENTION

In a preferred embodiment, the engine control method for a hybrid electric vehicle includes performing control into an idle stop state if predetermined idle stop conditions are satisfied; determining if a present shift range is a reverse R range; determining if the reverse R range is maintained for a predetermined time interval if it is determined that the present shift range is the reverse R range; and disengaging idle stop if the reverse R range is maintained for the predetermined time interval.

Preferably, the idle stop conditions include the ignition being turned On, a hybrid control unit being in a control preparation completion state, an engine temperature being at a temperature equal to or greater than a predetermined temperature, a vehicle speed being at or greater than a first predetermined speed for at least a predetermined time, the vehicle speed being less than or equal to a second predetermined speed, no pressure decrease in a brake booster, a main battery maintaining a state of charge such that the motor can start the engine, a shift range not being in the reverse R range, a brake pedal being depressed, and an accelerator pedal not being depressed.

The method preferably further includes disengaging idle stop if the all the idle stop conditions except for the requirement that the shift range not be in the reverse R range are satisfied, in the case where the reverse R range is not maintained for the predetermined time interval.

In another preferred embodiment of the present invention, an engine control system for a hybrid electric vehicle includes an engine, a motor, and a controller. The motor is mounted to one side of the engine. The controller receives one or more signals indicating vehicle operational conditions, and performs control of operations of the engine and motor, wherein the controller is programmed to perform control logic that includes determining if predetermined idle stop conditions are satisfied based on the one or more signals; performing control into an idle stop state if the predetermined idle stop conditions are satisfied; and discontinuing idle stop if, following detection of a reverse range On signal, it is determined that the reverse range On signal is maintained for a predetermined time interval.

The control logic programmed into the controller preferably further includes disengaging idle stop if all the idle stop conditions except for the requirement that the shift range not be in the reverse R range are satisfied in the case where the reverse R range is not maintained for the predetermined time interval.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
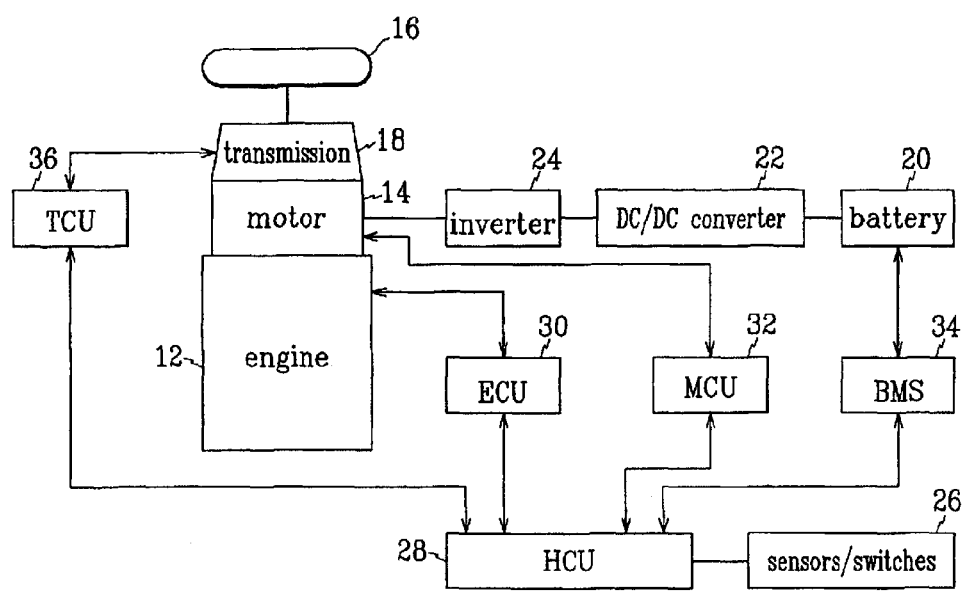
FIG. 1 is a schematic block diagram of an engine control system for a hybrid electric vehicle according to a preferred embodiment of the present invention.

As shown in FIG. 1, an engine control system according to a preferred embodiment of the present invention and related elements includes an engine 12 that utilizes the combustion of fuel to generate rotational force, a motor 14 mounted to one side of the engine 12 and that uses electrical energy to generate rotational force, and a transmission 18 for transmitting the rotational forces of the engine 12 and the motor 14 to wheels 16.

The system further includes a battery 20 supplying electrical energy to drive the motor 14, a DC/DC converter 22 for performing conversion of a direct current (DC) power level input to the battery 20 or output therefrom, and an inverter 24 mounted between the DC/DC converter 22 and the motor 14. The inverter 24 converts an AC power of the DC/DC converter 22 to DC power then supplies the DC power to the motor 14 during a start-up mode, and converts AC power supplied from the motor 14 into DC power then supplies the DC power to the DC/DC converter 22 during a regeneration mode.

The engine control system further includes a hybrid control unit (HCU) 28 that receives signals from a plurality of sensors and switches 26, which detect drive conditions of the vehicle and output corresponding signals. Based on the received signals, the HCU 28 generates and outputs control signals for the control of the engine 12. The control signals generated by the HCU 28 on the basis of the signals from the sensors and switches 26 control subordinate units of an engine control unit (ECU) 30, a motor control unit (MCU) 32, a battery management system (BMS) 34, and a transmission control unit (TCU) 36.

The ECU 30 controls operation of the engine 12 using control signals for a fuel amount controller, an ignition timing controller, etc. The MCU 32 and the BMS 34 perform control of the motor 14 and the battery 20, respectively. The TCU 36 controls the operation of the transmission 18.

The sensors and switches 26 may be easily conceived by those skilled in the art to which the present invention pertains. The sensors and switches 26 may include an engine coolant temperature sensor for detecting a temperature of engine coolant, a vehicle speed sensor for detecting vehicle speed, a brake input sensor for detecting a brake input, a battery voltage sensor for detecting a voltage level of the battery 20, an accelerator pedal sensor for detecting a depressed state of an accelerator pedal, a brake pedal sensor for detecting a depressed state of a brake pedal, and an inhibitor switch for detecting a present shift range. Other sensors and switches that are easily conceived by those skilled in the art may also be included.

The HCU 28, ECU 30, MCU 32, BMS 34, TCU 36, and the sensors and switches 26 use a conventional protocol to communicate. Again, this is easily conceived by those skilled in the art to which the present invention pertains. The HCU 28 and the ECU 30 each include a microprocessor that may be programmed to execute an engine control method for hybrid electric vehicles according to a preferred embodiment of the present invention.

Figure 2:
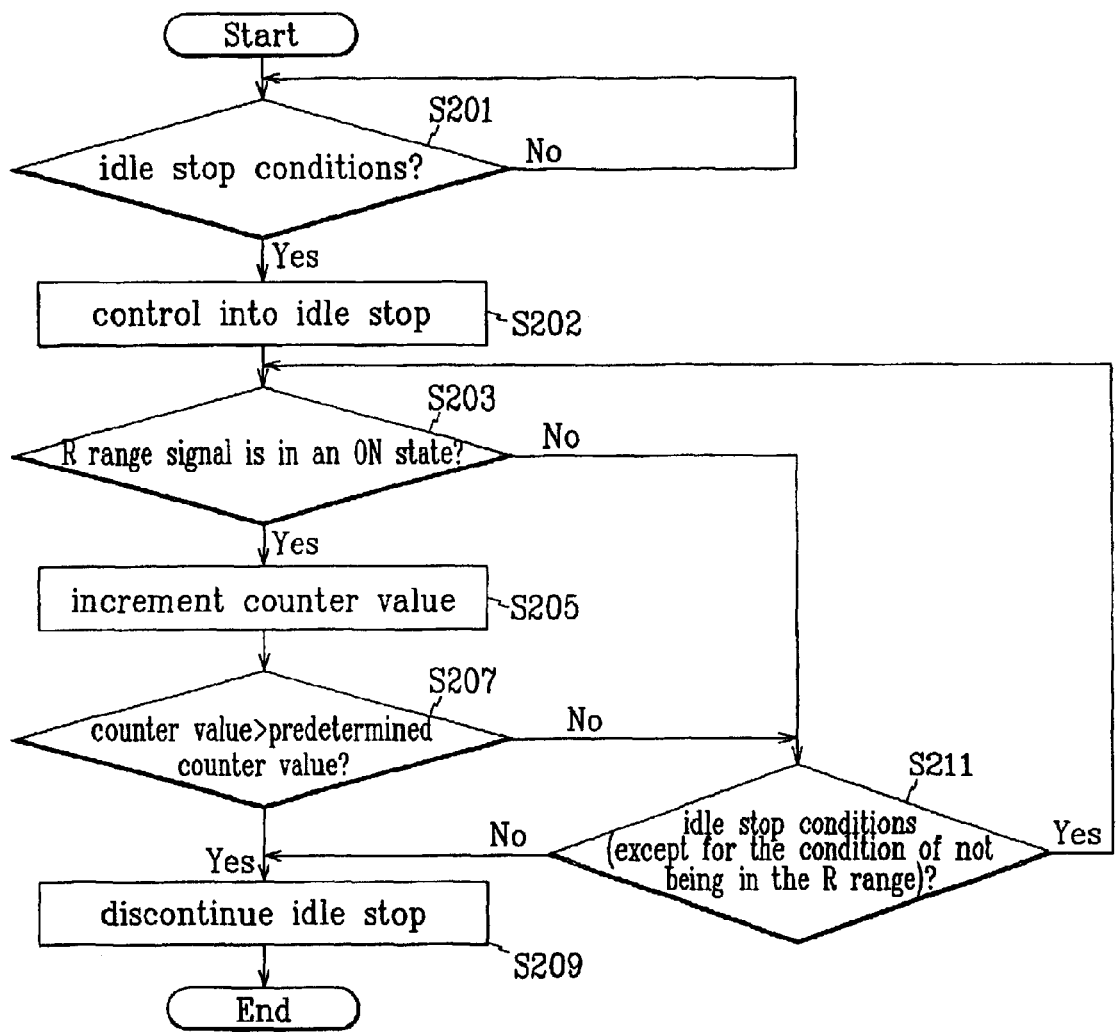
FIG. 2 is a flow chart of an engine control method for a hybrid electric vehicle according to a preferred embodiment of the present invention.

An engine control method for a hybrid electric vehicle according to a preferred embodiment of the present invention will now be described with reference to FIG. 2.

First, the HCU 28 determines whether idle stop conditions are satisfied in step S201. The idle stop conditions include (1) the ignition being turned On, (2) the HCU 28 being in a control preparation completion state, (3) the engine coolant temperature being at a temperature equal to or greater than a predetermined temperature, (4) the vehicle speed being at or greater than a predetermined speed for at least a predetermined time, (5) the vehicle speed being less than or equal to a predetermined speed, (6) no pressure decrease in a brake booster, (7) a main battery (e.g., 144V battery) maintaining a state of charge such that the motor 14 can start the engine 12, (8) a shift range not being in a reverse R range, (9) the brake pedal being depressed, and (10) the accelerator pedal not being depressed. Idle stop refers to discontinuing the operation of the engine 12 by cutting off fuel injection and ignition.

The HCU 28 being in a control preparation completion state refers to a state in which the MCU 32 and the BMS 34 are able to respectively control the motor 14 and the battery 20. That is, if signals that indicate the ability to control the motor 14 and the battery 20 are input to the HCU 28 from the MCU 32 and the BMS 34, the HCU 28 determines that it is in a control preparation completion state.

If the engine coolant temperature is excessively low, the motor 14 is unable to operate properly. Accordingly, the requirement that the engine coolant temperature be greater than or equal to a predetermined temperature is one of the conditions for idle stop. As an example, the predetermined temperature may be set at 70° C.

Further, vehicle speed being at or greater than a predetermined minimum speed for at least a predetermined time is a condition for idle stop so that idle stop is effected only after a certain period of stable driving occurs, that is, so that idle stop is not initiated too frequently. An example of this condition may include the parameters of a vehicle speed greater than or equal to 12 km/h at a time interval of 7 seconds or more. The other vehicle speed condition of the vehicle speed being less than or equal to a predetermined speed ensures that idle stop is effected when the vehicle is stopped or nearly so. A vehicle speed of 0.3 km/h may be used as the predetermined vehicle speed in this instance.

The condition of no pressure decrease in a brake booster is included to exclude the case where the brake pedal is depressed for a long period such that the brake is unable to be sufficiently driven.

If all the above conditions are satisfied, the HCU 28 determines that idle stop may be performed such that control signals are output to discontinue the operation of the engine 12. That is, if the idle stop conditions are satisfied in step S201, the HCU 28 performs control into idle stop in step S202.

Subsequently, the HCU 28 determines if an R range signal is in an On state in step S203. If it is determined in step S203 that the R range signal is in an On state, a counter value is incremented in step S205. It is then determined in step S207 if the counter value has exceeded a predetermined counter value.

If it is determined in step S207 that the counter value is greater than the predetermined counter value, the idle stop state is discontinued in step S209. Here, if the counter value exceeds the predetermined counter value, this indicates that an On state of the R range signal has been maintained for at least a predetermined time interval. The predetermined time interval may, for example, range between about 100–300 milliseconds, although other times may be set as appropriate for a particular vehicle. An example of a preferred predetermined time interval is about 200 milliseconds.

If it is determined that the R range signal does not indicate an On state in step S203 or that the counter value has not exceeded the predetermined counter value in step S207, it is determined if the idle stop conditions are satisfied in step S2111. Here, all the conditions for idle stop engagement are checked except for the condition of not being in the reverse R range. If any of the conditions are not satisfied (except for the requirement of not being in the reverse R range), step S209 of disengaging idle stop is performed. On the other hand, if all the conditions are satisfied, the process is returned to step S203.

In the engine control system and method for a hybrid electric vehicle of the present invention described above, in which if the R range signal is detected for less than a predetermined time while in the idle stop state, idle stop is not disengaged. As a result, this better reflects driver intentions, improves driving convenience, and minimizes fuel consumption by preventing the unnecessary disengagement of idle stop.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. An engine control method for a hybrid electric vehicle, comprising:

initiating an idle stop state if predetermined idle stop conditions are satisfied;

determining if a present shift range is a reverse R range if idle stop initiated;

determining if the reverse R range is maintained for a predetermined time interval if it is determined the present shift range is the reverse R range; and disengaging idle stop if the reverse R range is maintained for the predetermined time interval.

2. The method of claim 1, wherein the idle stop conditions include (a) the ignition being in an On state, (b) a hybrid control unit being in a control preparation completion state, (c) an engine temperature being at a temperature equal to or greater than a predetermined temperature, (d) a vehicle speed being at or greater than a first predetermined speed for at least a predetermined time, (e) the vehicle speed being less than or equal to a second predetermined speed, (f) no pressure decrease in a brake booster, (g) a main battery maintaining a state of charge such that the motor can start the engine, (h) a shift range not being in the reverse R range, (i) a brake pedal being depressed, and (j) an accelerator pedal not being depressed.

3. The method of claim 2, further comprising disengaging idle stop if all the idle stop conditions except for the requirement that the shift range not be in the reverse R range are satisfied in the case where the reverse R range is not maintained for the predetermined time interval.

4. An engine control system for a hybrid electric vehicle, comprising:

an engine;

a motor mounted to one side of the engine; and a controller receiving one or more signals indicating vehicle operational conditions, and performing control of operations of the engine and motor, wherein the controller is programmed to perform control logic that includes determining if predetermined idle stop conditions are satisfied based on the one or more signals;

performing control into an idle stop state if the predetermined idle stop conditions are satisfied; and discontinuing idle stop if, following detection of a reverse range On signal, it is determined that the reverse range On signal is maintained for a predetermined time interval.

5. The engine control system of claim 4, wherein the idle stop conditions include (a) the ignition being in an On state, (b) a hybrid control unit being in a control preparation completion state, (c) an engine temperature being at a temperature equal to or greater than a predetermined temperature, (d) a vehicle speed being at or greater than a first predetermined speed for at least a predetermined time, (e) the vehicle speed being less than or equal to a second predetermined speed, (f) no pressure decrease in a brake booster, (g) a main battery maintaining a state of charge such that the motor can start the engine, (h) a shift range not being in the reverse R range, (i) a brake pedal being depressed, and (j) an accelerator pedal not being depressed.

6. The engine control system of claim 5, wherein the control logic programmed into the controller further includes disengaging idle stop if all the idle stop conditions except for the requirement that the shift range not be in the reverse R range are satisfied in the case where the reverse R range is not maintained for the predetermined time interval.

7. An engine control method for an idle stop state in a hybrid electric vehicle, comprising:

determining if a present shift range is a reverse R range;

determining if the reverse R range is maintained for a predetermined time interval if it is determined the present shift range is the reverse R range; and disengaging idle stop if the reverse R range is maintained for the predetermined time interval.

8. The method of claim 7, wherein the predetermined time interval is between about 100–300 milliseconds.

9. The method of claim 8, wherein said determining if the reverse range is maintained for a predetermined time comprises incrementing a counter and comparing said counter to a predetermined counter value.

10. The method of claim 8, wherein said predetermined time interval is about 200 milliseconds.

* * * * *